Patented Nov. 17, 1931

1,832,710

UNITED STATES PATENT OFFICE

NOBUO ISHIDA, OF EBARAGUN, TOKYOFU, JAPAN

HEAT INSULATING FILLER

No Drawing.   Application filed January 4, 1928.   Serial No. 244,564.

This invention relates to a process for filling up the space between the inner and outer walls of a refrigerator or the like characterized by that a material obtained by boiling down and pressing with paraffin well-known filling materials, particularly fibrous materials having capillaries such as waste cotton, waste wool, or the like, into a plate or other suitable forms, is used for filling up the space between the inner and outer walls of a refrigerator or the like, and has for its object to eliminate defects of the walls of refrigerators being wrecked owing to the rotting of the filling materials hitherto used according to the known process, and to attain the purpose of filling up semi-permanently, so effectively as well as economically.

For the purpose of filling up, chiefly such materials as asbestos, cork, saw-dust, chaffs, rubbish of coke or charcoal or others have been used hitherto, but the water which condensed in said space between the inner and outer walls gathers at the bottom part of said space where temperature is lowest, and at length decomposes by corrosion the filling material there, thereby lessening its effect, and besides it corrodes first the bottom of the inner surface of the outer walls and then the remaining part of the inner surface of the walls surrounding the filling materials thus decomposed. This defect is eliminated in the present invention, and, besides, filling materials such as waste cotton and waste wool which have been disadvantageously used hitherto on account of said defect, can be employed effectively according to the present invention. For the purpose of filling up according to the present invention, filling materials having capillaries such as waste cotton and waste wool are used in boiling down with paraffin so as to fill up capillaries of the same with paraffin, in other words, these materials are boiled down together with paraffin so that the materials are saturated with paraffin, and then the mass is cooled so as to form a plate or other suitable forms, and inserted in the space between the walls of the refrigerator tightly, and the air being removed from said space as much as possible. Paraffin not only serves as a binder for the materials but completely fills the capillaries of said materials, and since the capillaries of these materials contain a great quantity of air, has operated against their successful use. The ideal process for filling up the space between the walls lies in making the interior entirely vacuous, but such is practically impossible and would require considerable expenses, so it is by no means a practical method. In the hitherto known method, only materials which are less liable to corrode due to the action of condensed water such as ground charcoal, asbestos, or the like are used, but waste cotton, waste wool, or the like cannot be made use of, whereas, according to the present invention, not only the hitherto used materials, but also very cheap ones such as waste cotton or other like rubbishes can be used so effectively. Furthermore, the present invention preventing the rotting of the walls, eliminates all other defects as above mentioned, and constitutes an effective, novel, industrial invention.

In the present invention, a mixture consisting of equal volumes of paraffin, waste cotton and waste wool is boiled down to form a plastic mass, and when cooled is formed into a plate, and this plate is used as filling material, the thick plate being inserted tightly into and completely fills the space which has been filled up with the known filling materials hitherto, and this process is finished by removing the air out of said space as much as possible.

Said space being filled up according to the present invention, no air is conducted into the inner part, so the present invention has no defect as in the known method, and, the paraffin being between the walls of the refrigerator, there is no liability of its melting.

Having now particularly described and ascertained the nature of my said invention and in what manner the same is to be performed, I declare that what I claim is:—

1. The method of making a filling plate for the space between the walls of a refrigerator, consisting of mixing equal volumes of cotton waste and waste wool and paraffin, boiling down the mixture to fill the capillaries of the fibrous material with paraffin and to render the mixture a plastic mass of proper consistency and when cooled forming the mass into a plate of the size and shape to completely fill the said space.

2. As a new article of manufacture, a filling plate for the space between the walls of a refrigerator, consisting of a plate of the size and shape of said space, formed of equal volumes of paraffin and waste cotton and waste wool, whose capillaries are filled with paraffin.

In testimony whereof I hereunto affix my signature.

NOBUO ISHIDA.